May 30, 1944.  R. B. COTTRELL  2,350,301
SIDE BEARING
Filed June 14, 1941  2 Sheets-Sheet 1
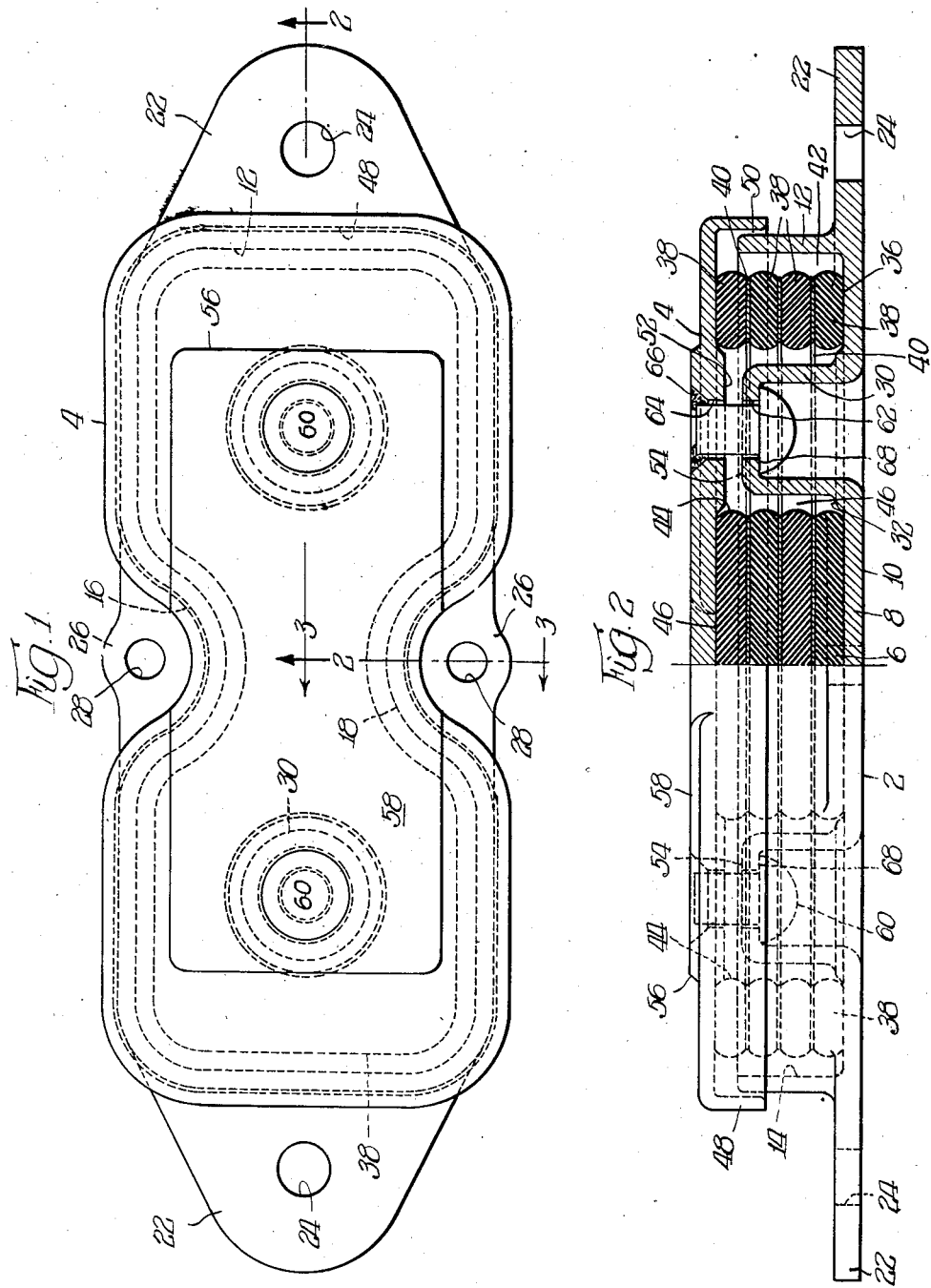
INVENTOR.
Robert B. Cottrell,
BY
ATTY

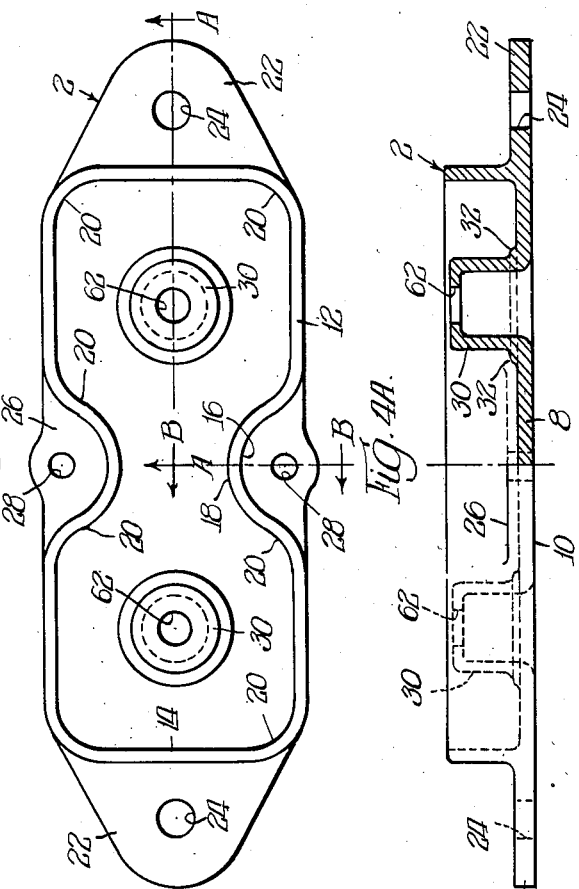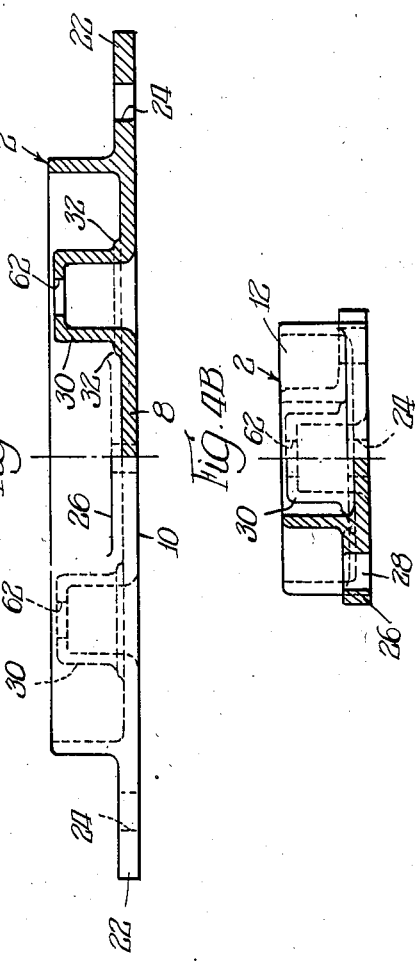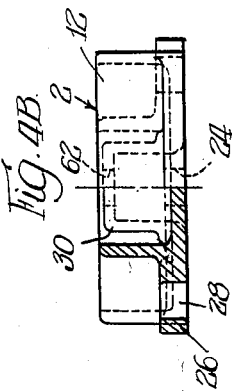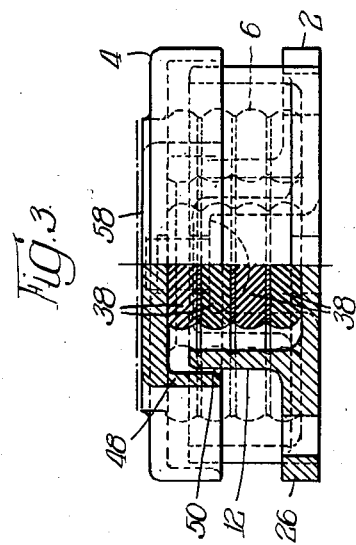

Patented May 30, 1944

2,350,301

UNITED STATES PATENT OFFICE 2,350,301

SIDE BEARING

Robert B. Cottrell, Chicago, Ill., assignor to American Steel Foundries, Chicago, Ill., a corporation of New Jersey Application June 14, 1941, Serial No. 398,007

8 Claims. (Cl. 308—138)

My invention relates to side bearings for railway car trucks and more particularly to a side bearing utilizing resilient material such as rubber or rubber composition.

A general object of my invention is to design a resilient side bearing which has a minimum of parts and which conforms to service and manufacturing requirements. My resilient side bearing is so constructed that it may be readily applied to different types of railway car trucks.

My invention includes a side bearing wherein the resilient means comprises a plurality of pads of any suitable resilient material secured to separator plates and wherein the number of separator plates and resilient pads may be varied in order to obtain the desired capacity.

Another object of my invention is to afford stop means for limiting the closure of the side bearing and compression of the resilient pads.

A further object of my invention is to design a side bearing utilizing resilient pads wherein the bottom casing is telescoped within the top casing in order to substantially prevent extraneous matter from lodging within the side bearing.

In the drawings, Figure 1 is a top plan view of my novel side bearing.

Figure 2 is a side elevation, half in section, of the side bearing shown in Figure 1, the section being taken substantially in the longitudinal vertical plane bisecting the side bearing as indicated by the line 2—2 of Figure 1.

Figure 3 is an end view, half in section, of the side bearing shown in Figure 1, the section being taken substantially in the vertical plane bisecting the bearing transversely as indicated by the line 3—3 of Figure 1.

Figures 4, 4A and 4B are detailed views of the bottom casing used in the side bearing shown in Figures 1 to 3, Figure 4 being a top plan view, Figure 4A being a side view, half in section, the section being taken in the vertical plane bisecting the casing longitudinally as indicated by the line A—A of Figure 4, and Figure 4B being an end view, half in section, the section being taken substantially in the vertical plane bisecting the casing transversely as indicated by the line B—B of Figure 4.

In detail, my novel side bearing includes a bottom casing 2, a top casing 4, and resilient means 6 under compression between the top casing and the bottom casing. The bottom casing 2 comprises an oblong base 8 presenting a flat outer surface 10 affording a convenient seat on an associated truck member. Integrally formed with the base 8 is an upstanding continuous flange 12 defining substantially rectangular pockets 14, 14 at opposite ends of the base 8. Adjacent the transverse center line of the base the upstanding flange 12 flares inwardly as at 16, 16 (Figure 4) to define a narrow channel portion 18 joining the rectangular end pockets 14, 14. It may be noted that the corners of the rectangular end portions and the mergence of said end portions with the narrow neck-like portion are formed with smooth radii as at 20, 20.

At each end, extending outwardly from the adjacent rectangular end pocket 14, the base 8 has a tapered portion 22 of relatively thick metal section. The opening 24 in each tapered end portion 22 is adapted to accommodate a member for securing the bottom casing to an associated truck member. The inward flaring at 16, 16 of the upstanding flange 12 exposes portions 26, 26 of the base 8, said portions having a relatively thick metal section and being perforated as at 28, 28 to accommodate a member for securing the bottom casing to a different type of associated truck member.

At approximately the center of each rectangular end portion a hollow stud 30 projects upwardly from the base 8, said stud merging with said base along smooth radii as at 32, 32.

Within the enclosure formed by the end pockets 14, 14 and the channel portion 18 and defined by the upstanding flange 12 are resilient means 6 seated on the base 8 as at 36. The resilient means 6 may be formed as a composite resilient member including a plurality of pads 38, 38 of any suitable resilient material and metal separator plates 40, 40 interposed between adjacent pads 38, 38 and secured thereto in any convenient manner as by vulcanizing. The pads 38, 38 and separator plates 40, 40 are of substantially the same configuration as the pockets 14, 14 and channel portion 18, said pads being spaced from the flange 12 as at 42 to permit free flowing of said rubber when said bearing is compressed. The resilient means 6 is also formed with the spaced apertures 44, 44 which accommodate the hollow lugs 30, 30 and which are spaced from said lugs as at 46, 46.

Seated on top of the resilient means 6 as at 47 is the top casing 4, said top casing having substantially the same configuration as that defined by the upstanding flange 12 of the bottom casing. A continuous depending flange 48, formed at the edges of the top casing 4, externally overlaps or is telescoped over the upstanding flange 12 as at 50 in order to substantially prevent oil or other extraneous matter from lodging within the pockets defined by the upstanding flange 12. On the inner surface of the top casing 4 may be formed spaced bearing pads 52, 52 adapted to be received within the apertures 44, 44 on the resilient member for positioning thereof and for abutment at 54 with the top surface of the hollow studs 30, 30 to limit compression of the resilient member 6 and to limit closure of the side bearing. On the top surface of the casing 4 is formed a substantially rectangular raised bearing pad 56 presenting a flat surface 58 for abutment with the car body side bearing. It is readily understood, of course, that the top surface 58 may be crowned if so desired.

The side bearing is maintained in assembled relationship by rivets 60, 60 having their heads accommodated within the hollow studs 30, 30 and extending through aligned openings 62, 62 and 64, 64 in the bottom and top casing respectively for securement with the top casing as by welding at 66. The head of each rivet 60 may thus have relative movement within each hollow stud 30 upon relative movement of the top and bottom casings and each head may abut the hollow stud 30 as at 68 to limit expansion of the side bearing.

It may be noted that the resilient means 6 is maintained under compression when the side bearing is not under load and as load is applied the resilient means will be placed under further compression. It will be understood that the number of resilient pads 38, 38 and separator plates 40, 40 may be varied in order to obtain the desired operating capacity.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a side bearing, a bottom casing comprising a base web with an upstanding flange, a plurality of hollow studs upstanding from said web, a block of resilient material seated on said web and confined by said flange, said block having openings therethrough for the reception of said studs, a top casing seated on said block and having a depending flange in telescopic relationship with said first-mentioned flange, bearing pads on said top casing received within respective of said openings, each of said pads serving to position said block and being engageable with the associated stud on the closure stroke of the bearing to limit said stroke, and means fixed to said top casing centrally of each pad and projecting into an opening in the associated stud in slidable interlocking engagement therewith to limit the expansion stroke of the bearing.

2. In a side bearing, a bottom casing comprising a base web with an upstanding flange, a plurality of hollow studs upstanding from said web, a block of resilient material seated on said web and confined by said flange, said block having openings therethrough for the reception of said studs, a top casing seated on said block and having a depending flange in telescopic relationship with said first-mentioned flange, bearing pads on said top casing received within respective of said openings, each of said pads serving to position said block and being engageable with the associated stud on the closure stroke of the bearing to limit said stroke, and means fixed to said top casing centrally of each pad and projecting into an opening in the associated stud in slidable interlocking engagement therewith to limit the expansion stroke of the bearing, said pads and said openings being of substantially greater diameter than said studs to prevent said resilient material from flowing between said studs and said pads on the closure stroke of the bearing.

3. In a side bearing, a bottom member comprising a base web, a plurality of spaced hollow studs upstanding from said web, a block of resilient material seated on said web, said block having spaced openings therethrough for the reception of respective studs, a top member seated on said block and comprising spaced bearing pads received within respective of said openings, each of said pads serving to position said block and being engageable with the associated stud on the closure stroke of the bearing to limit said stroke, and means fixed to said top member centrally of each pad and projecting into an opening in the associated stud for slidable interlocking engagement therewith to limit the expansion stroke of the bearing.

4. In a side bearing, a bottom member comprising a base web, a plurality of spaced hollow studs upstanding from said web, a block of resilient material seated on said web, said block having spaced openings therethrough for the reception of respective studs, a top member seated on said block and comprising spaced bearing pads received within respective of said openings, each of said pads serving to position said block and being engageable with the associated stud on the closure stroke of the bearing to limit said stroke, and means fixed to said top member centrally of each pad and projecting into an opening in the associated stud for slidable interlocking engagement therewith to limit the expansion stroke of the bearing, said pads and said openings being of substantially greater diameter than said studs to prevent said resilient material from flowing between said studs and said pads on the closure stroke of the bearing.

5. In a side bearing, a bottom member comprising a base web with a plurality of hollow studs upstanding therefrom, a block of resilient material seated on said web, said block having openings therethrough receiving respective of said studs, a top member seated on said block and comprising bearing pads received within respective of said openings, each of said pads serving to position said block and being engageable with the associated stud on the closure stroke of the bearing to limit said stroke, and a rigid member fixed to said top member and projecting through the associated one of said openings into an opening in the associated stud, said rigid member having means engageable with a portion of said stud on the expansion stroke of the bearing to limit the same.

6. In a side bearing, a bottom member comprising a base web with a hollow stud upstanding therefrom, a block of resilient material seated on said web and comprising an opening therethrough, said stud extending into said opening, a top member seated on said block and comprising a bearing pad received within said opening for positioning said block, said pad and said stud being formed and arranged to engage each other on the closure stroke of the bearing to limit the same, and means fixed to said top member and projecting through said opening into an opening through said stud, said means being formed and arranged to engage a portion of said stud on the expansion stroke of the bearing to limit the same.

7. In a side bearing, a bottom member comprising a base web with a hollow stud upstanding therefrom, a block of resilient material seated on said web and comprising an opening therethrough, said stud extending into said opening, a top member seated on said block and comprising a bearing pad received within said opening for positioning said block, said pad and said stud being formed and arranged to engage each other on the closure stroke of the bearing to limit the same, said pad and said opening being of substantially greater diameter than said stud to prevent said resilient material from flowing between said stud and said pad on the closure stroke of the bearing.

8. In a side bearing, a member comprising a web with a stud projecting therefrom, a block of resilient material seated against said web and comprising an opening receiving said stud, and another member seated against said block and comprising a bearing pad received within said opening, said pad being formed and arranged to abut said stud on the closure stroke of the bearing to limit the same, said pad and said opening being of substantially greater diameter than that of said stud to prevent said resilient material from flowing between said stud and said pad on the closure stroke of the bearing, and means on said last-mentioned member slidably interlocked with said stud.

ROBERT B. COTTRELL.